United States Patent [19]
Harrigan et al.

[11] Patent Number: 5,867,298
[45] Date of Patent: Feb. 2, 1999

[54] DUAL FORMAT PRE-OBJECTIVE SCANNER

[75] Inventors: Michael E. Harrigan, Webster; Badhri Narayan; Drew D. Summers, both of Rochester, all of N.Y.

[73] Assignee: Eastman Kodak Company, Rochester, N.Y.

[21] Appl. No.: 771,367

[22] Filed: Dec. 16, 1996

[51] Int. Cl.⁶ ................................................. G02B 26/08
[52] U.S. Cl. ......................... 359/201; 359/203; 359/216; 347/261
[58] Field of Search .................................... 359/196, 197, 359/198, 201, 203, 212, 216, 217; 347/131, 254, 261

[56] References Cited

U.S. PATENT DOCUMENTS

| | | | |
|---|---|---|---|
| 3,944,323 | 3/1976 | Starkweather | 350/7 |
| 4,040,096 | 8/1977 | Starkweather | 358/302 |
| 4,247,160 | 1/1981 | Brueggemann | 350/6.8 |
| 4,413,878 | 11/1983 | Lettington | 359/203 |
| 4,537,465 | 8/1985 | Sherman et al. | 359/203 |
| 4,578,689 | 3/1986 | Spencer et al. | 346/160 |
| 4,651,169 | 3/1987 | Muka | 346/108 |
| 4,651,170 | 3/1987 | Chandler et al. | 346/108 |
| 4,734,715 | 3/1988 | Shiraishi | 346/108 |
| 4,953,036 | 8/1990 | Yoshimura | 358/400 |
| 5,187,606 | 2/1993 | Kondo et al. | 359/196 |
| 5,239,313 | 8/1993 | Marko et al. | 346/108 |
| 5,255,115 | 10/1993 | Kikuchi | 359/209 |
| 5,274,492 | 12/1993 | Razzaghi | 359/202 |
| 5,289,001 | 2/1994 | Rimoto et al. | 250/201.2 |

OTHER PUBLICATIONS

John C. Urbach, Tibor S. Fisli, and Gary K. Starkweather; Laser Scanning for Electronic Printing; Jun. 1982, Proceedings of the IEEE, vol. 70, No. 6, pp. 597–618.

*Primary Examiner*—Cassandra C. Spyrou
*Assistant Examiner*—Darren E. Schuberg
*Attorney, Agent, or Firm*—Nelson Adrian Blish; David A. Novais

[57] ABSTRACT

A dual format pre-objective scanner (10), for use in a laser printer, having an incident beam (22) from input optics (12) incident on a polygon tower (14) comprised of a first polygon (20) having a first diameter and first number of facets and a second polygon (30) having a second diameter and second number of facets, rotating about an axis (42) common to both first and second polygon. The polygon tower (14) is moved in a vertical direction so that the incident light is directed in a plane approximately perpendicular to the axis rotation of the first and second polygon, at either the first polygon (20) or the second polygon (30). The polygon tower (14) is also moved in a lateral direction approximately perpendicular to the axis (42) of rotation of the polygon tower (14). To change size and formats, the polygon tower (14) is moved simultaneously both vertically and laterally so that incident beams on the facets of the first polygon (20) become incident on the facets of the second polygon (30) at approximately the same distance from a scan lens (16).

19 Claims, 6 Drawing Sheets

DUAL FORMAT PRE-OBJECTIVE SCANNER

BACKGROUND OF THE INVENTION

1. Field of the Invention

This invention relates in general to laser printers using multi-faceted rotating polygon deflectors to expose photosensitive media and in particular to laser printers having the capability to print more than one image size and resolution.

2. Description of the Prior Art

In creating digital images on photosensitive media there are at least two different imaging applications with different requirements. The first application is for large format high quality images with fine text and graphics in which the production speed is not critical. These images are up to approximately 12 inches in width and use spot densities over 400 spots per inch. The second application is for smaller format images with large text and a requirement for high production speeds. In these images, the width is about 5 inches or smaller and the spot density is below about 400 spots per inch. In order to minimize the floor space or foot print required by two machines, it would be advantageous to use a single printer in which the format and spot density can be switched easily between the two applications described. In addition, the printer should use a single paper path for both formats and the cost to manufacture such a printer should be lower than that of two separate machines.

The use of laser printers, especially for creating electrostatic images such as in a photocopier, is widely known. In these applications, a single format and single resolution normally are used. High quality laser printers commonly incorporate optical correction means for a defect in the manufacture of polygons called pyramid error, which is a tilt of the polygon facets in such a way that the facets do not form a vertical cylinder. In other words, the facet normals do not all lie in the same plane, but can vary from facet to facet. Even small errors of this type causes extensive degradation of images because the error is periodic, that is, it recurs with each rotation of the polygon. This can lead to a defect in the image called banding. The human eye is very sensitive to banding errors and it would be desirable to eliminate this type of error.

One of the correcting means for polygon pyramid error is to make the facet conjugate to the image forming medium. In U.S. Pat. No. 4,040,096 by Starkweather, this conjugation is provided by a cylindrical lens which has power only in the page scan section of the beam U.S. Pat. No. 4,247,160 by Brueggemann, discloses a laser polygon printer which has a positive cylindrical mirror disposed between a polygon and an image forming medium. However, neither of these inventions prints more than one image format.

Printing more than one image resolution with one printer has been done by using a scanner with a reflecting surface which varies in width in the scanning direction. See G. Starkweather, U.S. Pat. No. 3,944,323. Other methods of using more than one image resolution with one printer are shown in U.S. Pat. Nos. 5,289,001; 5,274,492; 5,255,115; 5,239,313; 4,953,036; 4,734,715; 4,578,689. None of these patents disclose the use of multiple polygons and none use more than one scan length.

The use of more than one format is described in U.S. Pat. Nos. 4,651,170 and 4,651,169 by J. Chandler, D. Kessler, and E. Muka. In these patents, the format in the line scan direction, the scan length, is changed by adjusting the space between the polygon deflector and the image forming medium In order to maintain the beam focus on the medium in the scan section of the beam, the optics prior to the polygon deflector are modified. Also, the cylindrical mirror following the polygon is tilted and shifted in order to maintain the polygon mirror facet conjugate with the image forming medium The page scan format is changed via a speed change in the moving medium.

SUMMARY OF THE INVENTION

It is an object of the invention to provide a laser printer capable of producing images with different formats and spot densities.

The above and other objects are accomplished by a laser printer having a light source incident on a polygon tower comprised of a first polygon having a first diameter and first number of facets and a second polygon having a second diameter and second number of facets rotating about an axis common to both the first and second polygons. The polygon tower is moved in a vertical direction so that the incident light is directed in a plane approximately perpendicular to the axis rotation of the first and second polygon at either the first polygon or the second polygon. The polygon tower is also moved in a lateral direction approximately perpendicular to the axis rotation of the polygon tower. To change size and formats, the polygon tower is moved simultaneously both vertically and laterally so that incident beams on facets of the first polygon become incident on the facets of the second polygon at approximately the same distance from a scan lens.

DISCLOSURE OF THE INVENTION

Figure 1:
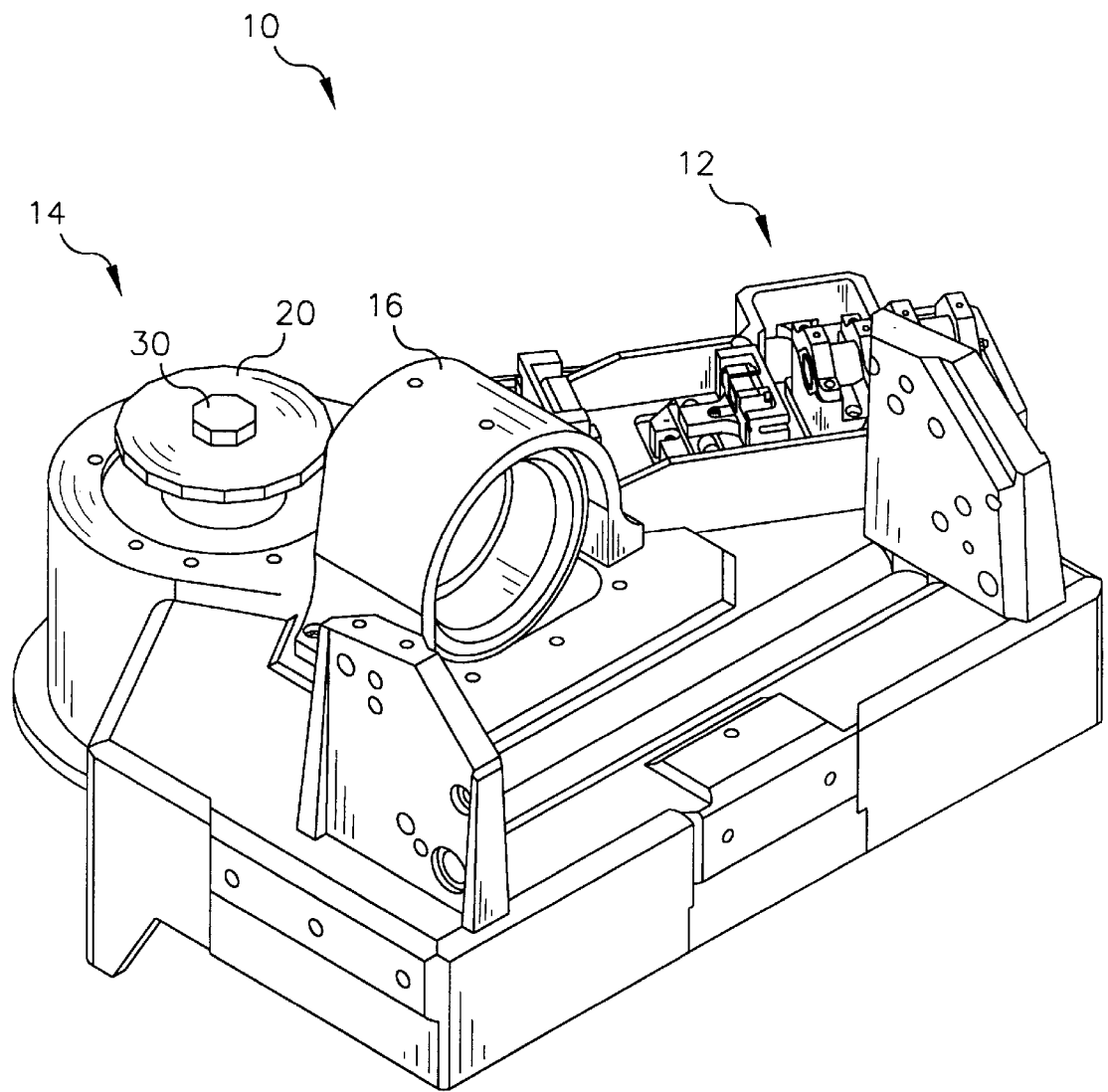
FIG. 1 is a perspective view of the optics for a laser thermal printer incorporating a multi-faceted dual polygon tower.
Figure 2:
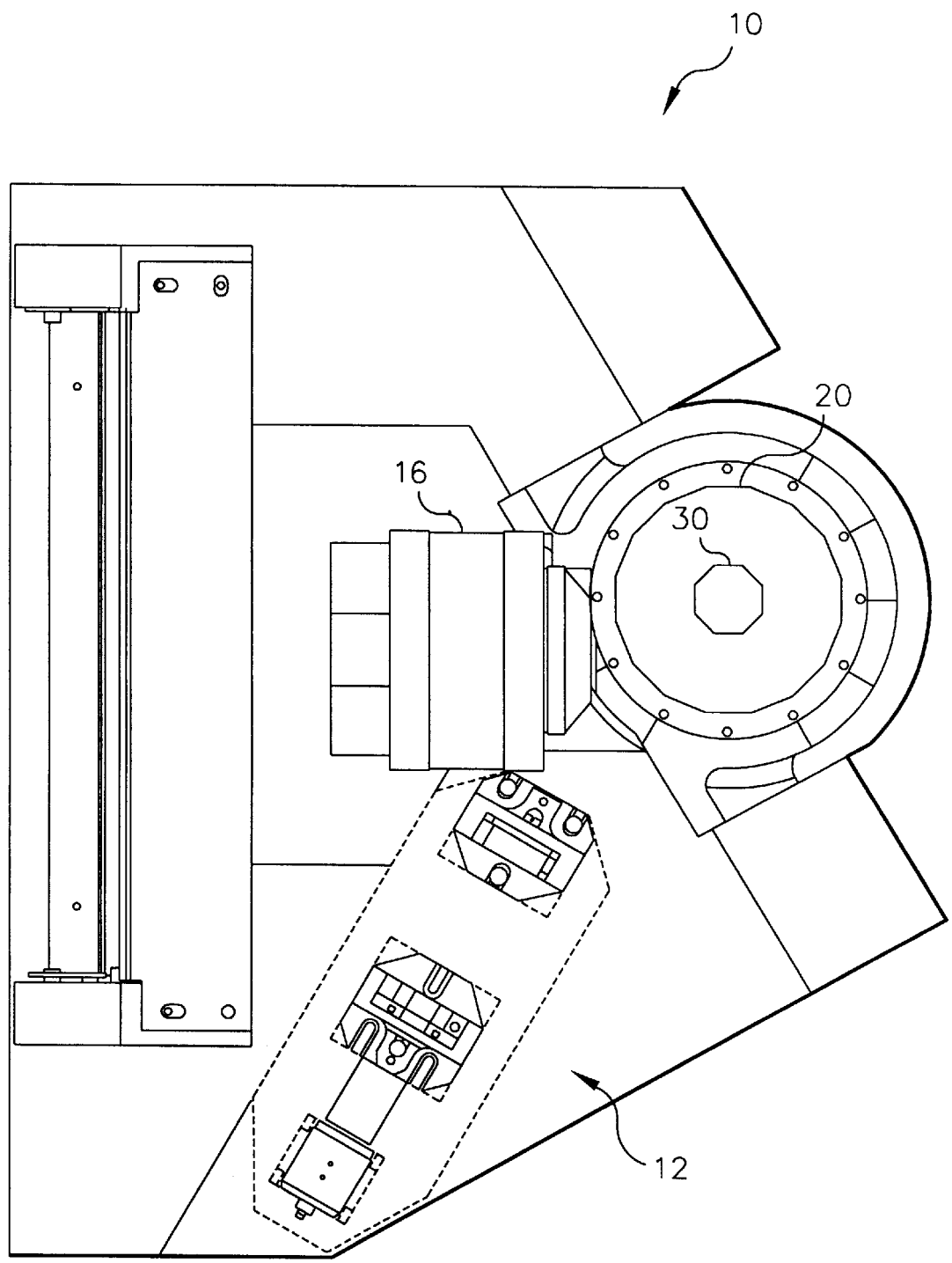
FIG. 2 is a top plan view of the optics for a laser thermal printer shown in FIG. 1.

FIGS. 1 and 2 show an example of the invention, but it should be understood that the invention is not restricted to the number of polygons shown, a particular number of facets per polygon, specific format sizes, or image resolutions. The dual format pre-objective scanner, referred to in general by numeral 10, is comprised of input optics 12, polygon tower 14 and scan lens 16. Input optics 12 may consist of a variety of different sources such as a single mode laser, for example a semiconductor or gas type laser, and lenses for focusing and collimating the light from the light source. The scan lens 16 focuses the light from the polygon tower 14 onto an image medium, not shown.

The term "scan lens" is used to refer to an optical system placed between the polygon deflector and the image receiving medium. Scan lenses are well known in the art and provide at least some of the following functions: Focusing the deflected beams of light to form pixels of the desired size at the medium in both the scan direction and cross scan direction of the beams, making the polygon facet optically conjugate to the medium, and placing the centroid of the pixel at the medium in an "f-theta" (fθ) position in the scan section of the lens. The fθ position is a distance along the scan line from the center of scan which is equal to the product of the scan lens focal length in the scan direction of the lens and the deflected beam angle with respect to the optical axis of the scan lens measured in radians as it enters the scan lens.

Figure 3:
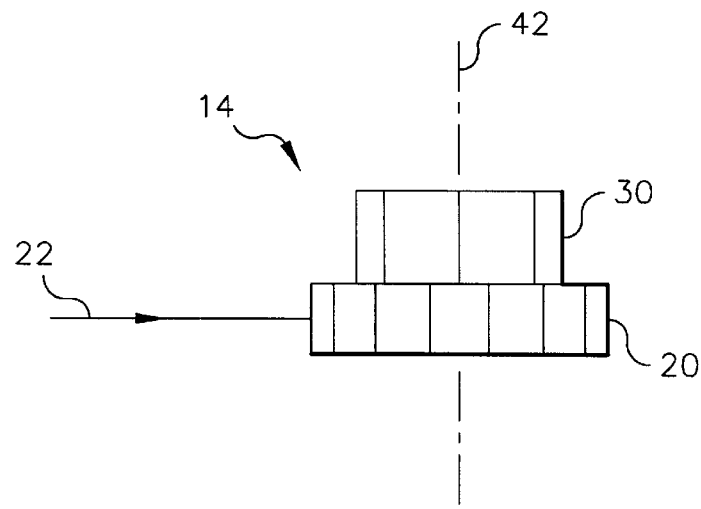
FIG. 3 is a schematic view of an incident light beam being deflected from a sixteen sided polygon.
Figure 4:
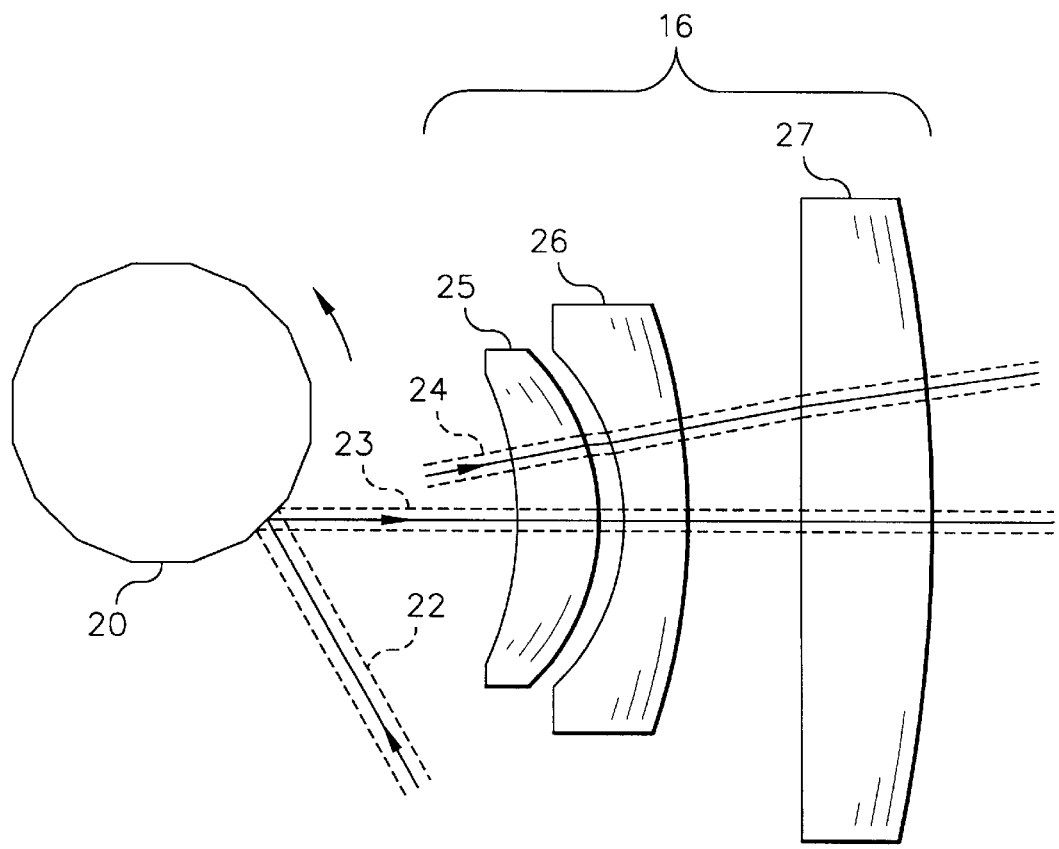
FIG. 4 is a schematic of a sixteen sided polygon deflecting an incident light beam through an objective lens.

The dual format pre-objective scanner operates by projecting a beam of light from input optics 12 onto either sixteen sided polygon 20 or eight sided polygon 30, both of which are mounted on a common axis of rotation 42 (FIG. 3). FIG. 2 shows a top plan view of the dual format pre-objective scanner shown in FIG. 1. FIGS. 3 and 4 show a side view and top plan view respectively of polygon tower 14.

FIG. 3 and 4 show sixteen sided polygon 20 deflecting an incident beam 22. The deflected beam 23 passes through the scan objective consisting of lenses 25, 26 and 27, also known as an fθ lens, and focuses to a spot at the center of a distant image forming medium, not shown. Deflected beam 24 is the path followed through the scan objective when the polygon has rotated counterclockwise by 6.2 degrees.

Figure 5:
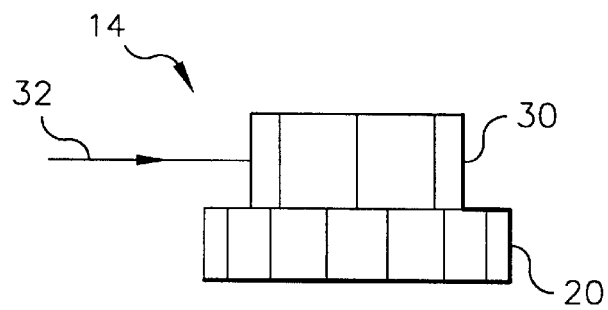
FIG. 5 is a schematic view of an incident light beam being deflected from an eight sided polygon.
Figure 6:
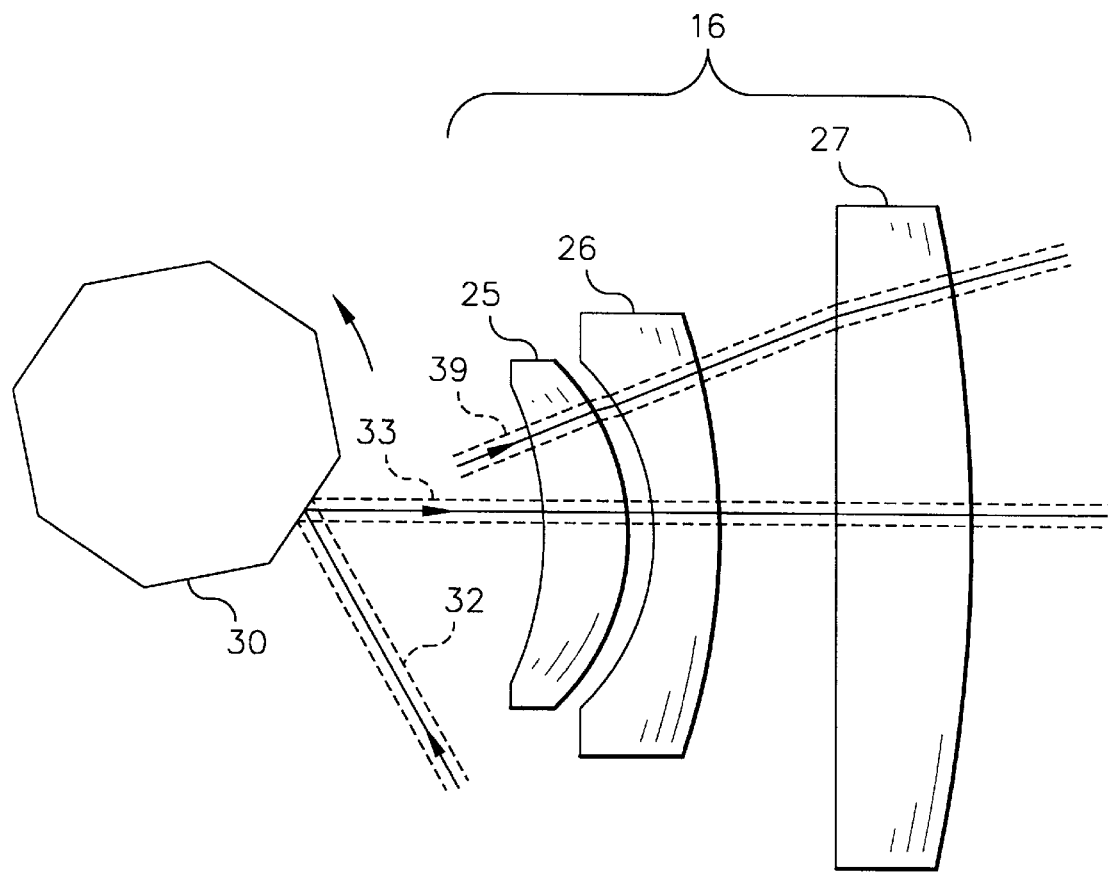
FIG. 6 is a schematic view of an eight sided polygon deflecting an incident beam through an objective lens.

FIG. 5 and 6 show eight sided polygon 30 deflecting an incident beam 32 of larger diameter along the same path through the same scan objective to a focused spot at the center of a distant image forming medium, not shown. Deflected beam 33 also passes through the scan lens. Deflected beam 39 is the path followed through the scan objective when the polygon has rotated counterclockwise by 12.4 degrees.

The sixteen sided polygon 20 is used for forming spots 0.169 millimeters in diameter measured at the $1/e^2$ diameter on the image forming medium. The image size scanned is 5 inches in length. The eight sided polygon 30 forms spots 0.128 millimeters in diameter at the $1/e^2$ diameter on the image forming medium. The image size scanned by the eight sided polygon 30 is 10 inches in length.

To solve the problem of using the same scan objective for more than one wavelength, image size, and resolution, it is necessary to consider carefully the selection of polygon sizes and number of facets. This is the normal starting point for a scanner design because the objective following the polygon is highly dependent on the polygon characteristics. The basic equation, Equation 1, provides for the minimum polygon size.

$$D_p = \frac{\beta \lambda S N}{2\omega_0 \pi^2 \epsilon} \cdot \frac{1}{\cos\left(\frac{\theta_i}{2}\right) \sin\left(\frac{\pi}{N}(1-\epsilon)\right)} \quad \text{Equation 1:}$$

$D_p$=diameter of the polygon measured across the corners (the diameter of a circle circumscribing the polygon)
S=length of the scan line
λ=wavelength of light
ε=duty cycle (the fraction of the angle subtended by the polygon facet during which the active scan takes place)
N=total number of facets on the polygon
$\omega_O$=radius of the beam waist (at the $1/e^2$ intensity level) at the image
β=truncation factor by the polygon at the end of scan as it rotates through the incident beam (A value of 1 means the corner of the facet clips the input beam at its $1/e^2$ level)
$\theta_i$=total angle between the incident beam and the deflected beam at the center of scan The above equation is based on the assumption that the incident beam is incident on the polygon in such a way that the beam clipping by the facet at the end of scan is the same at each end of scan. Equation 2 defines the quantity $B_S$, the perpendicular distance from the center of the polygon to the input beam. See FIGS. 7 and 8. The value of $B_S$ which provides the same clipping of the input beam at each end of scan is defined by Equation 2.

$$B_S = \frac{1}{2} D_P \sin\frac{\theta_i}{2} \cdot \cos\left(\frac{1}{2}(\theta_p - \Phi)\right) \quad \text{Equation 2:}$$

Figure 7:
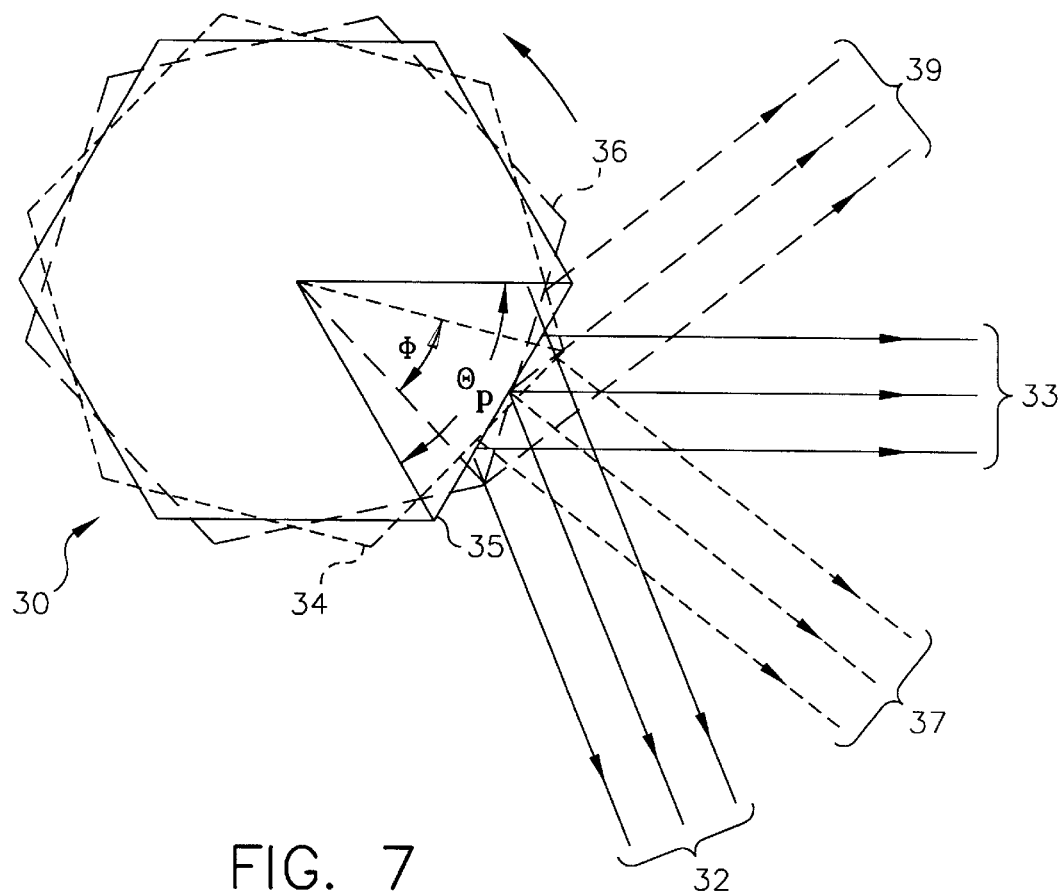
FIG. 7 is a top plan view of the eight sided polygon showing the beginning, center and end of scan.
Figure 8:
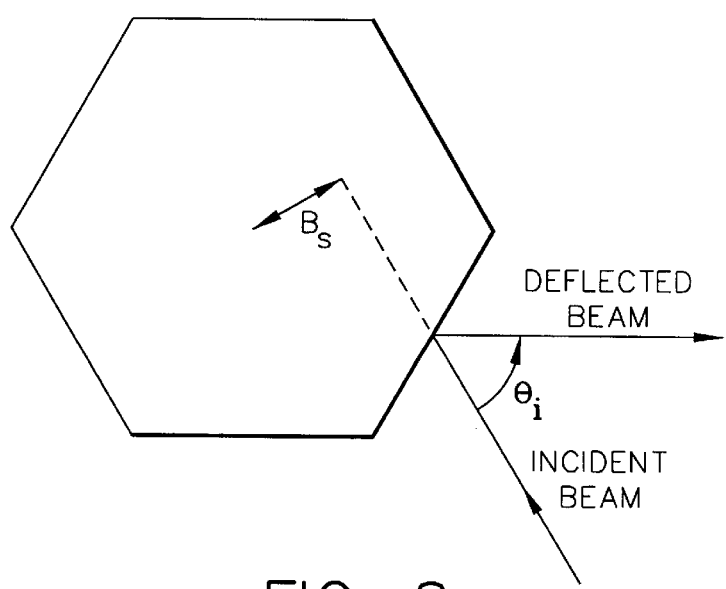
FIG. 8 is a top plan view of an eight sided polygon showing the input beam shift.

$\theta_p$=angle subtended by a single polygon facet
Φ=total rotation of the polygon required to scan S FIG. 7 shows eight sided polygon 30 at the beginning of scan in phantom 34, at the center of scan in solid 35, and at the end of scan in phantom 36. Incident beam 32 is deflected at the beginning of scan 37, at center of scan 33, and at the end of scan 39.

At one end of the scan the polygon has rotated by Φ/2 and at the other end of the scan it has rotated by -Φ/2. The polygon rotates in a single direction starting a scan at -Φ/2 and ending the scan at Φ/2. Selecting a value for $B_S$ according to Equation 2 makes the distance from the polygon facet corner to the upper edge of the input beam at one end of scan equal to the distance from the other polygon facet corner to the lower edge of the input beam at the other end of scan.

The minimum diameter of each polygon is sensitive to the number of facets and duty cycle. Frequently the argument of the Sine function in the denominator can be replaced by its argument in radians with only a small error. This error decreases as the number of facets increases. In fact the error is less than 3% when the number of facets is greater than or equal to eight. This results in the following simplified equation.

$$D_p = \frac{\beta \lambda S N^2}{2\omega_0 \pi^3 \epsilon (1-\epsilon) \cos\left(\frac{\theta_i}{2}\right)} \quad \text{Equation 3:}$$

With all other parameters fixed, the diameter grows as the number of facets squared. Also, the diameter is a minimum when the duty cycle, ε, is at a value of 0.5 and it grows rapidly as the duty cycle moves away from 0.5.

The diameter is proportional to the scan length and inversely proportional to the pixel size at the image. Therefore, one needs a larger polygon to scan more length and with higher resolution. The two requirements discussed above then would seem to be in conflict. Namely, a larger format and higher resolution both work to increase the polygon diameter. So, it would seem difficult to use the same or nearly the same size polygon for both a large format high resolution application and a small format low resolution application. However, when the need for printing speed in both devices is considered, a high number of facets will scan a larger number of lines per revolution than a low number of facets. Each facet produces one line of a raster scan while the scan in the perpendicular direction, referred to as the page scan direction, is usually accomplished by motion of the image medium with, for example, a cylindrical drum to which the image medium is attached.

The number of facets then can compensate for the scan length and resolution change and it does so in a desirable fashion for the two applications of interest. Namely, using a high number of facets for the low resolution small format printer compensates for the smaller size needed for this case in such a way that the polygons are nearly the same size. The idea is to keep the quantity $SN^2/\omega_O$ approximately constant for the two formats. The incidence angle would then be identical for both cases and the duty cycle and clip ratio would not be too different allowing the polygon for each format to be approximately the same size.

An additional step is to consider the possibility of using the same objective after the polygon for forming the pixels of both cases. For a so called "fθ" lens, the scan length or image height is proportional to the chief ray angle entering the lens. In fact, the fθ lens has the property that:

$$\frac{1}{2} S = f\theta_S$$

In this equation, S is the total scan length defined above, f is the focal length of the scan lens, and $\theta_s$ is one half the total optical scan angle in radians. Because a polygon mirror doubles the angle upon reflection, $\theta_s = \Phi$, the total mechanical rotation of the polygon through one facet. So, by the definition of the duty cycle, $\epsilon$:

$$\Phi = \epsilon \frac{2\pi}{N}$$

Where, the angle subtended by a facet is $2\pi/N$ radians, the maximum angle through which a polygon facet can rotate. If these two equations are used to solve for the focal length, the result is:

$$f = \frac{NS}{4\pi\epsilon}$$

To use the same objective for multiple format scans, it is necessary then to keep the quantity $$\frac{NS}{4\pi\epsilon}$$

the same for both scanners.

Combining these two equations we can solve for the number of facets squared in terms of the format size, duty cycle and scan lens focal length in the scan direction:

$$N^2 = \frac{16\pi^2\epsilon^2 f^2}{S^2}$$

With this substituted into the polygon diameter equation:

$$D_p = \frac{8\beta\lambda\epsilon f^2}{\omega_0\pi(1-\epsilon)\cos\left(\frac{1}{2}\theta_i\right)S}$$

Now we have an equation which can be used to see the implications of using the same focal length f for different scans and resolutions. For the two different formats, we assume the incidence angle, wavelength, and focal length are the same and use subscripts 1 and 2 for the values of each format.

$$D_1 = \frac{8\beta_1\lambda\epsilon_1 f^2}{\omega_{01}\pi(1-\epsilon_1)\cos\left(\frac{1}{2}\theta_i\right)S_1}$$

$$D_2 = \frac{8\beta_2\lambda\epsilon_2 f^2}{\omega_{02}\pi(1-\epsilon_2)\cos\left(\frac{1}{2}\theta_i\right)S_2}$$

Now, if we put all the same quantities on the right hand side of each equation:

$$\frac{D_1\omega_{01}(1-\epsilon_1)S_1}{\beta_1\epsilon_1} = \frac{8\lambda f^2}{\pi\cos\left(\frac{1}{2}\theta_i\right)} = \frac{D_2\omega_{02}(1-\epsilon_2)S_2}{\beta_2\epsilon_2}$$

This equation can be re-written:

$$D_1 = D_2 \frac{\beta_1}{\beta_2} \frac{\omega_{02}}{\omega_{01}} \frac{(1-\epsilon_2)}{(1-\epsilon_1)} \frac{\epsilon_1}{\epsilon_2} \frac{S_2}{S_1}$$

This relates the minimum size polygon for one format and resolution to that of a second format and resolution. Different duty cycles and clip ratios are allowed for each scanner. Ordinarily, the pixels sizes and formats are determined and there is very little flexibility in the quantity $$\frac{\omega_{02}}{\omega_{01}} \frac{S_2}{S_1}.$$

If one tries to use different duty cycles, a severe penalty occurs in the minimum size polygon requirement for the other format. One can find the results in the table below by substituting some numbers.

| $\epsilon_1$ | $\epsilon_2$ | % polygon change from $\epsilon_2 = \epsilon_1$ |
|---|---|---|
| .4 | .38 | 8.77 |
| .5 | .48 | 8.33 |
| .6 | .58 | 8.62 |
| .7 | .68 | 9.80 |

This shows that the second polygon minimum size grows about 9% when it is used at a duty cycle only 0.02 different than the first. It can also be seen that the minimum percent change occurs when the first polygon is used at a 50% duty cycle.

Since the minimum polygon size is proportional to the number of facets squared, it may be best to choose the size of the polygon for the high speed application first. This polygon is likely to be larger even with the lower demand of format size and pixel size if the speed requirement is dominant.

If the duty cycle $\epsilon$ is the same for both polygons, then since the quantity $$\frac{NS}{4\pi\epsilon}$$

must be constant in order to use the identical focal length objective, it is necessary that the product NS have the same value for both formats. This is the explanation for the fact that the sixteen sided polygon 20 scans five inches while the eight sided polygon 30 scans 10 inches.

Another possibility is to use the same polygon for the smaller format that is used for the large format, and adjust the duty cycle factor so that:

$$\frac{S_1}{\epsilon_1} = \frac{S_2}{\epsilon_2}$$

With this method, one would turn on the laser only during the central five inch part of the 10 inch scan, but this would make inefficient use of the high performance data processing electronics and laser power. Not only would productivity suffer because of the smaller number of lines scanned per polygon rotation, but only a small part of the potential scan of each facet would be used, therefore, this is not a desirable technique.

To choose the clip factor, β, one needs to consider spot size growth from clipping in conjunction with spot growth due to lack of a completely flat image field. The spot growth due to astigmatism and field curvature across the scan may be large enough that very little spot growth due to clipping may be permitted. This means that the clipping factor may have to be larger than one in order to reduce spot growth from clipping at the end of scan. Fortunately, the small format polygon will naturally have a smaller scan angle due to the larger number of facets, so the field angle seen by the scan lens will be reduced with a consequent reduction in field curvature and astigmatism If the spot size growth requirements are not so stringent for this format, it may be possible to use a β factor less than one which would make the spot grow more at the ends of scan. The advantage of a β factor less than one is the reduced size of the polygon given by a smaller β.

For the large format polygon with its larger scan angle, the astigmatism and field curvature will likely have a major impact on spot growth across the scan. It may be large enough that the spot growth caused by clipping must be minimized. This polygon is generally smaller since it has a smaller number of facets. There could be enough leeway to use a polygon larger than the minimum to reduce spot growth from clipping. The large format polygon can have a β larger than one and still not have an adverse affect on the polygon size.

To ease mechanical changes between formats it would generally be desirable to have both input beams incident at the same angle to the facet at zero scan angle so that the angles between the input beam and deflected beam remain at $\theta_i$. It would still be necessary to change the diameter of the input beam to adjust the resolution or pixel size at the image medium. With no change in the scan lens the most direct way to affect the pixel size is the beam diameter incident on the polygon. This method of printing then requires a modification in the optical system prior to the polygon for each resolution.

It will be important to keep the polygon facet in a conjugate relationship with the image medium in the page scan section of the optical system to avoid banding. This can be achieved by shifting each polygon into place in such a way that the distance, measured along the scan optical axis, from the facet at the center of scan to the first component of the fθ or object lens is substantially the same.

Figure 9:
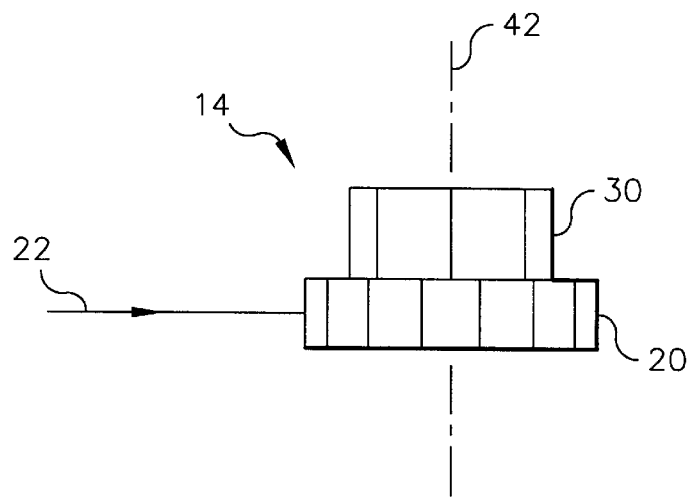
FIG. 9 is a schematic view of the polygon tower with the incident beam striking the sixteen sided polygon.
Figure 10:
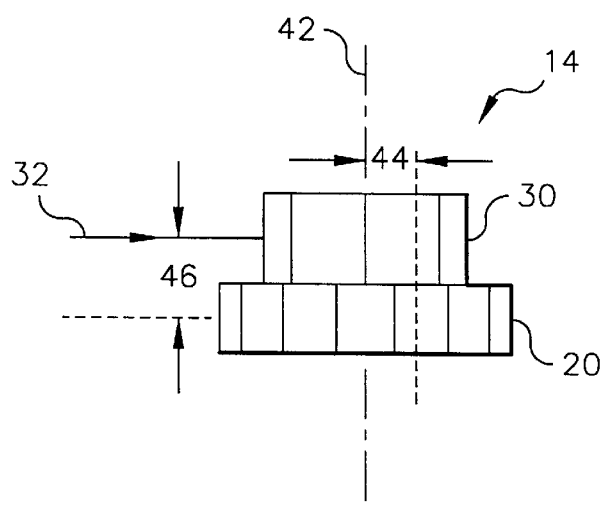
FIG. 10 is a schematic view of the polygon tower with the incident beam striking the eight sided polygon.
Figure 11:
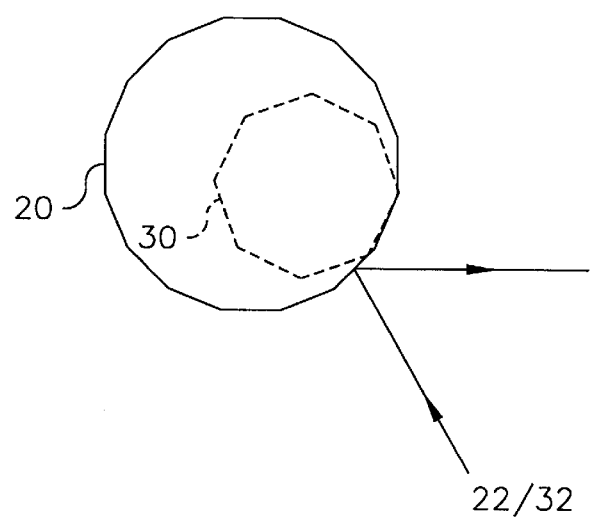
FIG. 11 is a top plan view showing the incident beam striking a facet of the sixteen sided polygon and the eight sided polygon shown in phantom.

The polygons must be shifted in two directions, vertically and laterally, as shown in FIG. 9, 10 and 11. In FIG. 9 the incident beam strikes the larger of the two polygons 20. After the vertical shift by a predetermined amount 46, the incident beam strikes the smaller of the two polygons 30 shown in FIG. 10. FIG. 10 and 11 show the lateral shift 44 of the two polygons. In FIG. 11 the incident beam is striking a facet of the larger polygon. As shown in phantom, after the polygons have been shifted in the direction of the incident beam, the incident beam is striking a facet of the smaller polygon.

Optimally, each polygon should be positioned so that each has its best value of $B_S$ for equalizing the pixel growth due to clipping. If this is not possible because of a conflict with the requirement to maintain the page section conjugacy of the facet, then the $B_S$ value should be optimized for the application which has the most sensitivity to variations in pixel growth.

The invention has been described in detail with particular reference to preferred embodiment thereof, but it will be understood that variations and modifications can be effected within the spirit and scope of the invention as set forth in the claims. For example, the polygon tower could be comprised of more than two polygons mounted on a common axis of rotation. Three or more polygons could be mounted on a common axis of rotation 42 to provide multiple formats for laser printing. Also, even though the invention is incorporated in a laser printer as described, the invention could be used in any scanning application. In addition the lateral and vertical shifts of the polygon tower could be done simultaneously or they could be performed sequentially.

Yet an additional modification that falls within the scope of the claims of the present invention is the number of facets may be any number of facets for the first polygon and the second polygon even though the specific examples shown is eight facets for the smaller polygon and sixteen facets for the larger polygon.

| Parts List | |
|---|---|
| 10 | Pre-objective scanner |
| 12 | Input optics |
| 14 | Polygon tower |
| 16 | Scan Lens |
| 20 | Sixteen sided polygon |
| 22 | Incident beam |
| 23 | Deflected beam |
| 24 | Deflected beam |
| 25 | Lens |
| 26 | Lens |
| 27 | Lens |
| 30 | Eight sided polygon |
| 32 | Incident beam |
| 33 | Deflected beam |
| 34 | Polygon at beginning of scan |
| 35 | Polygon at center of scan |
| 36 | Polygon at end of scan |
| 37 | Deflected beam |
| 39 | Deflected beam |
| 42 | Axis of rotation |
| 44 | Lateral shift |
| 46 | Vertical shift |

We claim:

1. A dual format pre-objective scanner comprising:

a polygon tower comprised of a first polygon having a first diameter and a first number of facets and a second polygon having a second diameter and a second number of facets, said polygon tower being mounted for rotation on an axis common to said first and second polygons;

a light source producing a beam of light incident on said polygon tower; and a scan lens for receiving light from said polygon tower;

wherein said polygon tower is moved in a direction parallel to said axis of rotation to shift a point of contact of said incident beam between said first polygon and said second polygon.

2. A dual format pre-objective scanner as in claim 1 wherein said polygon tower is moved in a lateral direction approximately perpendicular to said axis of rotation so that a distance between said first polygon and said scan lens when said beam of light is incident on said first polygon is approximately equal to a distance between said second polygon and said scan lens when said beam of light is incident on said second polygon.

3. A multiple format laser printer comprising:
a polygon tower mounted for rotation about an axis wherein said polygon tower has at least:
a first polygon having a first number of facets; and
a second polygon having a second number of facets, wherein said axis is common to both said first polygon said second polygon;
a light source which produces a beam of light incident on said polygon tower; and
a scan lens located between an image forming medium and said polygon tower wherein said beam of light is reflected from said polygon tower through said scan lens to said medium;
wherein said first number of facets is greater than said second number of facets.

4. A multiple format laser printer as in claim 3 wherein said first number of facets is equal sixteen and said second number of facets is equal to eight.

5. A multiple format laser printer as in claim 3 wherein said polygon tower is moved in a direction parallel to said axis to change a point of contact of said beam of light on said polygon tower from said first polygon to said second polygon.

6. A multiple format laser printer as in claim 5 wherein said polygon tower is moved in a direction perpendicular to said axis.

7. A multiple format laser printer as in claim 3 wherein said polygon tower is moved in a direction parallel to said axis to change a point of contact of said beam of light on said polygon tower from said second polygon to said first polygon.

8. A multiple format laser printer as in claim 7 wherein said polygon tower is moved in a direction perpendicular to said axis.

9. A multiple format laser printer as in claim 3 wherein said polygon tower is moved in a direction parallel to said axis to change a point of contact of said beam of light on said polygon tower between said first polygon and said second polygon.

10. A multiple format laser printer as in claim 9 wherein said polygon tower is moved in a direction perpendicular to said axis.

11. A multiple format laser printer as in claim 3 wherein said polygon tower is moved in a direction parallel to said axis to change a point of contact of said beam of light on said polygon tower between said first polygon and said second polygon and said polygon tower is simultaneously moved in a direction perpendicular to said axis.

12. A multiple format laser printer as in claim 3 wherein each polygon of said polygon tower has a duty cycle $\epsilon$ which is substantially the same as the duty cycle of the other polygon.

13. A multiple format laser printer as in claim 3 wherein each polygon of said polygon tower has a duty cycle $\epsilon$ which varies from the duty cycle of the other polygon by less than 0.1.

14. A multiple format laser printer as in claim 3 wherein each polygon of said polygon tower has a duty cycle $\epsilon$, a scan length S, and a number of facets N, and the value NS/$\epsilon$ for each of said polygons is approximately equal.

15. A multiple format laser printer as in claim 14 wherein each polygon of said polygon tower has a clipping factor $\beta$ and said first polygon has a greater number of facets than said second polygon, the clipping factor of said first polygon is given by:

$$0.8 \leq \beta \leq 1.2$$

and the clipping facto of said second polygon is given by:

$$1 \leq \beta \leq 2.$$

16. A multiple format laser printer as in claim 14 wherein an input beam shift $B_S$ is set to an optimal value given by:

$$B_S = \frac{1}{2} D_P \sin\frac{\theta_i}{2} \cdot \cos\left(\frac{1}{2}(\theta_P - \Phi)\right)$$

wherein:

$D_P$=diameter of one of said polygons measured across the corners (the diameter of a circle circumscribing said polygon)

$\theta_i$=total angle between said beam of light and the deflected beam at the center of scan $\theta_P$=angle subtended by a single polygon facet $\Phi$=total rotation of said polygon required to scan S for at least one of said formats.

17. A multiple format laser printer comprising:
a polygon tower mounted for rotation about an axis wherein said polygon tower has at least:
a first polygon having a first number of facets; and
a second polygon having a second number of facets, wherein said axis is common to both said first polygon said second polygon;
a light source which produces a beam of light incident on said polygon tower; and
a scan lens located between an image forming medium and said polygon tower wherein said beam of light is reflected from said polygon tower through said scan lens to said medium;
wherein a diameter of said first polygon is greater than a diameter of said second polygon.

18. A multiple format laser printer comprising:
a polygon tower mounted for rotation about an axis wherein said polygon tower has at least:
a first polygon having a first number of facets; and
a second polygon having a second number of facets, wherein said axis is common to both said first polygon said second polygon;
a light source which produces a beam of light incident on said polygon tower; and
a scan lens located between an image forming medium and said polygon tower wherein said beam of light is reflected from said polygon tower through said scan lens to said medium;
wherein a relation between a scan length S, an image pixel radius $\omega_O$, and a number of facets N on said each polygon of said polygon tower is given by:

$$.5 \leq \frac{SN^2}{\omega_0} \leq 2.$$

19. A dual format pre-objective scanner comprising a polygon tower comprised of a first polygon having a first diameter and a first number of facets and a second polygon having a second diameter and a second number of facets, said polygon tower being mounted for rotation on an axis common to said first and second polygon, wherein said first diameter is greater than said second diameter;

a light source producing a beam of light incident on said polygon tower; and a scan lens for receiving light from said polygon tower.

* * * * *